June 10, 1952  C. J. LUDEKING  2,600,003
FORAGE UNLOADER

Filed Aug. 12, 1949  2 SHEETS—SHEET 1

Inventor
Clarence J. Ludeking

By Clarence A. O'Brien
and Harvey B. Jacobson
Attorneys

June 10, 1952  C. J. LUDEKING  2,600,008
FORAGE UNLOADER
Filed Aug. 12, 1949  2 SHEETS—SHEET 2

Inventor
Clarence J. Ludeking

By Clarence A. O'Brien
and Harvey B. Jacobson
Attorneys

UNITED STATES PATENT OFFICE 2,600,008

FORAGE UNLOADER

Clarence J. Ludeking, Decorah, Iowa

Application August 12, 1949, Serial No. 109,931

3 Claims. (Cl. 214—83.14)

This invention relates to a forage unloader or distributor and has for its primary object to unload hay, straw, or similar material from a portable rack or wagon and to distribute the material from the wagon into a conventional blower unit.

Another important object of this invention is to provide a rotary straw or hay distributor, which is vertically mounted at the rear open end of a portable rack or wagon and which receives the material from a conventional feed apron at the bottom of the rack to advance the material into a blower unit, the distributor also functioning as a door or end wall, when the rack is being loaded, to prevent the undesired loss of material.

Another important object of this invention is to rake or remove hay or straw from a wagon or rack into a blower unit in a steady and uniform manner preventing improper distribution of the material and preventing choking of the outlet.

These and ancillary objects and structural features of merit are attained by this invention, the preferred embodiment of which is set forth in the following description and illustrated in the accompanying drawings, wherein.

Figure 1:
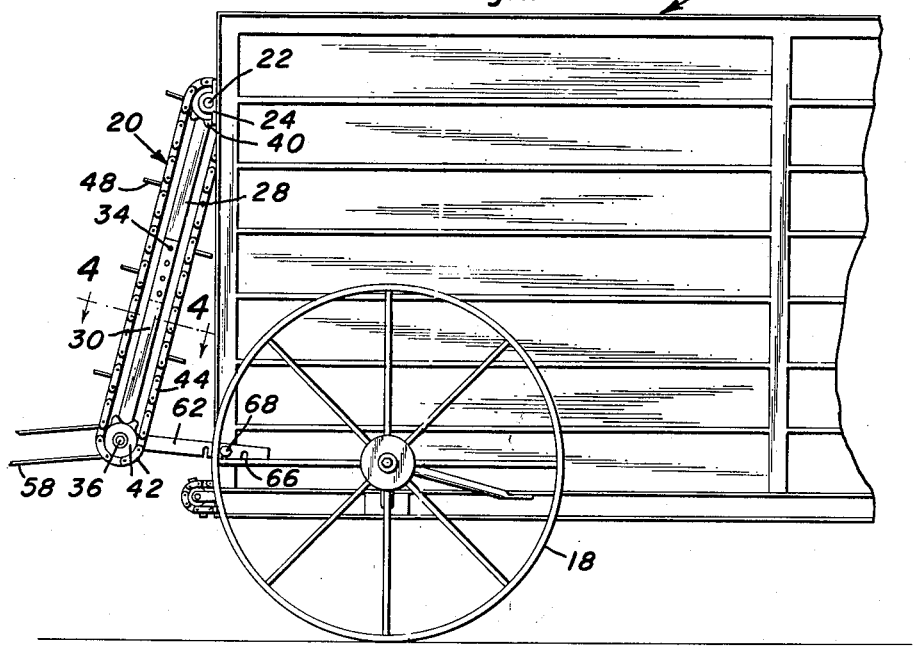
Figure 1 is a fragmentary side elevation of a conventional portable hay rack, with the distributing or unloading device, constructed in accordance with the principles of this invention, operatively attached to the rear open end thereof.
Figure 4:
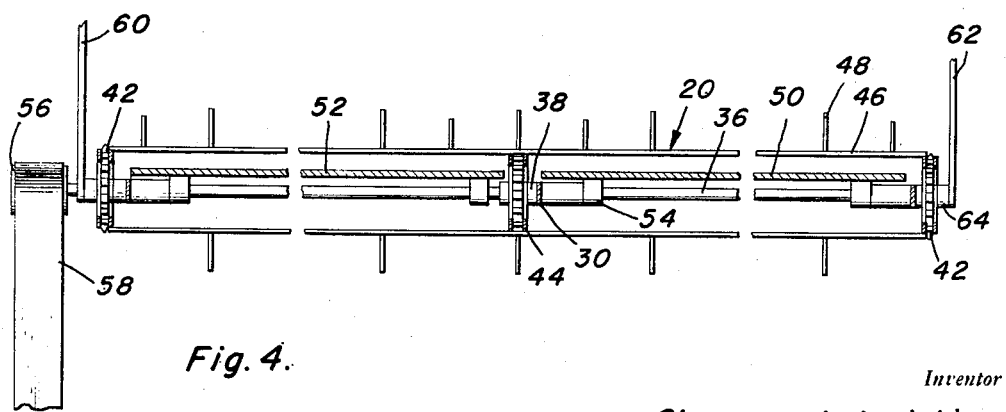
Figure 4 is a transverse sectional view taken on the line 4—4 of Figure 1.
Figure 2:
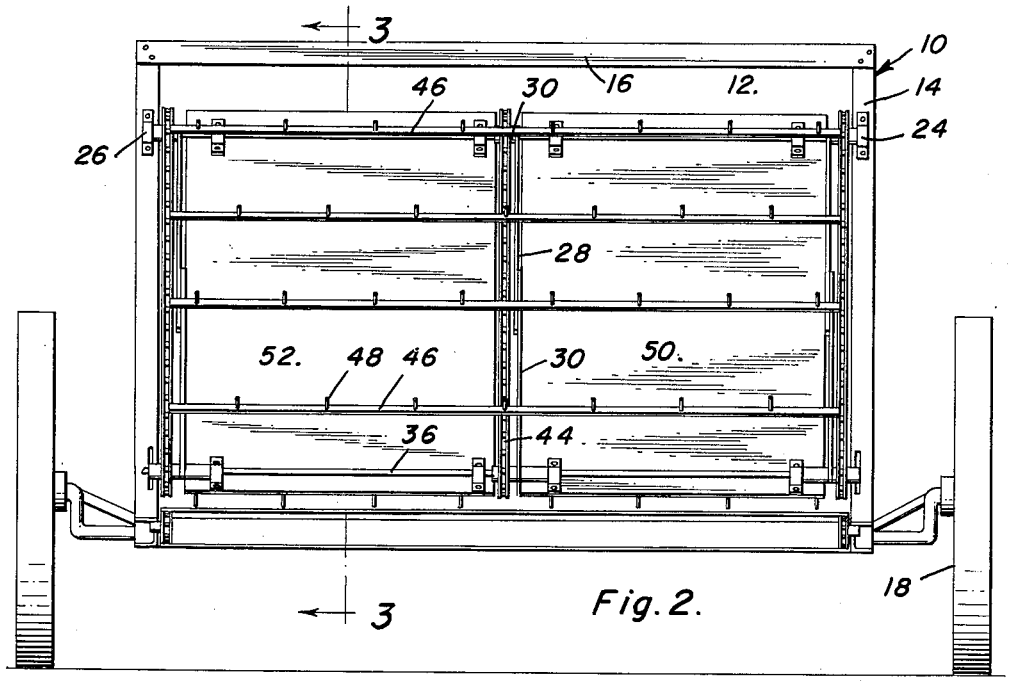
Figure 2 is a rear elevational view.
Figure 3:
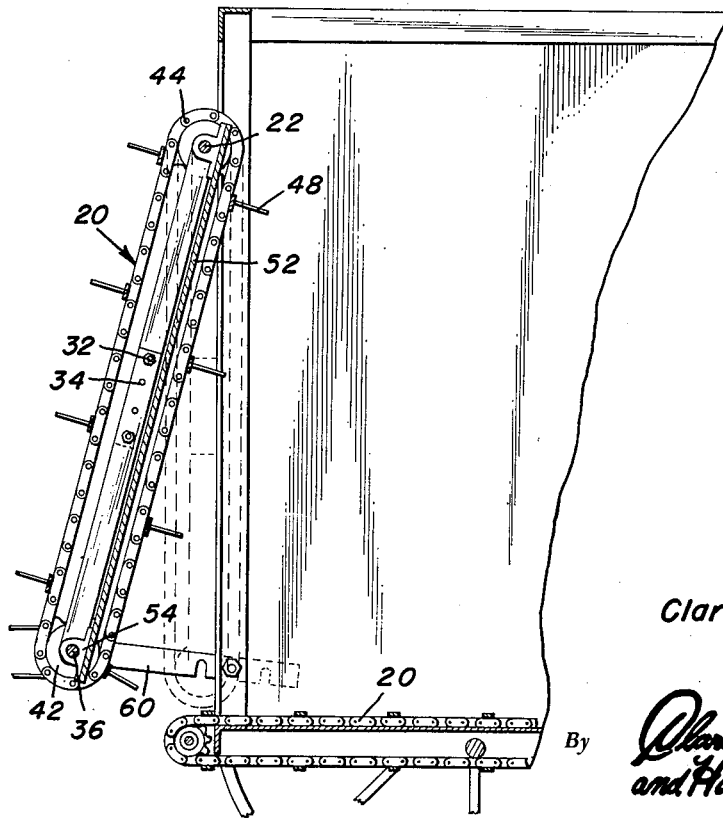
Figure 3 is a vertical longitudinal section on the plane of line 3—3 of Figure 2.

Referring now more particularly to the drawings, the reference numeral 10 generally designates a conventional portable straw or hay rack, which is constructed of angle irons and rods and which is formed with an open rear end 12 defined by vertically extending opposed end bars 14 and a top cross bar 16. The rack is supported on front and rear wheels 18 and a feed apron 19 is operatively disposed at the bottom of the rack for moving the material rearwardly toward the open rear end.

Operatively disposed at the rear end of the rack and positioned in a substantially vertical plane so that the lower end thereof is complementarily disposed adjacent to the outer reach of the apron is an unloading or distributing device 20 which is adjustably attached to the rack. The unloading device includes an upper transversely disposed shaft 22 which has its opposing ends mounted in bearing brackets 24 and 26, which are secured to the opposing end bars 14, adjacent the upper ends thereof, so that the shaft 22 is disposed parallel with and spaced downwardly from the cross top bar 16. A frame is carried by the shaft 22 and includes a plurality of transversely spaced depending rigid bars 28 which are secured by bearing collars 29 to the shaft at their upper ends. Complementary rigid bars 30 are adjustably joined in overlapping fashion at their upper ends to the lower ends of the bars 28 by means of bolts or similar connecting pins 32, which are transversely disposed through aligned vertically spaced transverse openings 34 formed in the lower ends of the bars 28 and the upper ends of the bars 30.

A drive shaft 36 is transversely disposed at the lower end of the rear end of the rack and is supported by bearing sleeves 38 which are formed on the lower end of the bars 30.

Sprocket wheels 40 are carried by the shaft 22 and are disposed in spaced fashion on the shaft, the sprockets being disposed at the opposing ends of the shaft and at the center thereof. Sprockets 42 are secured on the drive shaft 36 in alignment with the sprockets 40 and are connected thereto by means of endless connecting chains 44. A plurality of vertically spaced transversely disposed rods or bars 46 are secured to the spaced chains 44 and are provided with extending teeth 48.

Panels 50 and 52 are secured to the shafts 22 and 36 by means of bearing collars 54 and are disposed between the rotary chains and bars 46.

A pulley 56 is fixed on one end of the shaft 36 and a belt 58 is operatively associated therewith, the belt being driven by any suitable prime mover and functioning to rotate the drive shaft 36.

The lower end of the unloading device 20 is adapted to be moved outwardly from the rack, the frame pivoting around the shaft 22, as seen in Figure 1, so that the unloading device is disposed in an inclined vertical plane creating an outlet between the lower end of the device and the outer reach of the apron for unloading purposes. Means is, therefore, provided for retaining the device in such a position and preferably includes a pair of arms 60 and 62 which are secured at one end by means of collars 64 to the shaft 36. The arms are formed at their opposing ends, along the lower longitudinal edge thereof, with spaced notches 66. The notches are adapted to engage on lugs 68 which project laterally from the end bars 14 of the rack.

During the loading of the rack, the unloading device 20 is disposed in a vertical position, with the lower end thereof held in vertical alignment with the upper end by means of the arms 60 and 62, so that none of the material can fall out of the rear end, due to the panels 50 and 52 which function as doors. When it is desired to unload the rack and advance the material therein to a conventional blower unit, the lower end of the unloading device is swung outwardly about the shaft 22 and is held in such a position by means of the arms 60 and 62. The shaft 36 is then rotated through the belt 58 and the chains 44 are driven by the sprockets 42 and pass around the idler sprockets 40. Movement of the chains move the bars 46 and the teeth of the bars are brought into engagement of the material moved rearwardly by the endless apron 19, so that the teeth receive the material from the end of the apron and move or advance the same into the blower unit.

It can be appreciated that the device is of a simple nature and can be inexpensively constructed and operated and will materially reduce the time required for unloading material from a rack or wagon. Of course, although the device is primarily designed for unloading straw, hay and similar material, it can be employed for other unloading purposes. Therefore, it is to be understood that various changes may be made in the device, without departing from the scope of the appended claims.

Having described the invention, what is claimed as new is:

1. A forage distributor comprising a rack having an open end and adapted to contain the material to be distributed, means operatively disposed in said rack for moving the material towards the open end, a frame vertically disposed at the open end and pivotally mounted at its upper end to the rack, a drive shaft rotatably disposed transversely at the lower end of the frame, a second shaft transversely disposed at the upper end of the frame, a pulley on one end of said drive shaft for connection with an outside source of power, aligned sprockets on said drive shaft and second shaft, endless chains driven by said sprockets, toothed bars transversely mounted on said chains and adjustable means carried by the lower end of the frame for detachably securing the same to the rack.

2. The combination of claim 1, wherein said last means includes a pair of arms secured by bearing sleeves on the drive shaft, said arms being formed at one edge with spaced notches, and lugs carried by the rack on which the notches are adapted to engage.

3. The combination of claim 1, wherein panels are connected between said shafts to prevent the material from falling out between the shafts.

CLARENCE J. LUDEKING.

REFERENCES CITED

The following references are of record in the file of this patent:

UNITED STATES PATENTS

| Number | Name | Date |
|---|---|---|
| 956,792 | Beskow et al. | May 3, 1910 |
| 1,526,704 | Hird | Feb. 17, 1925 |
| 2,434,718 | Recker | Jan. 20, 1948 |
| 2,463,643 | Recker | Mar. 8, 1949 |

FOREIGN PATENTS

| Number | Country | Date |
|---|---|---|
| 713,058 | France | Aug. 10, 1931 |